June 21, 1949. L. PREISMAN 2,474,067
PRODUCTION OF CARBON BISULFIDE AND HYDROGEN SULFIDE
Filed May 3, 1946
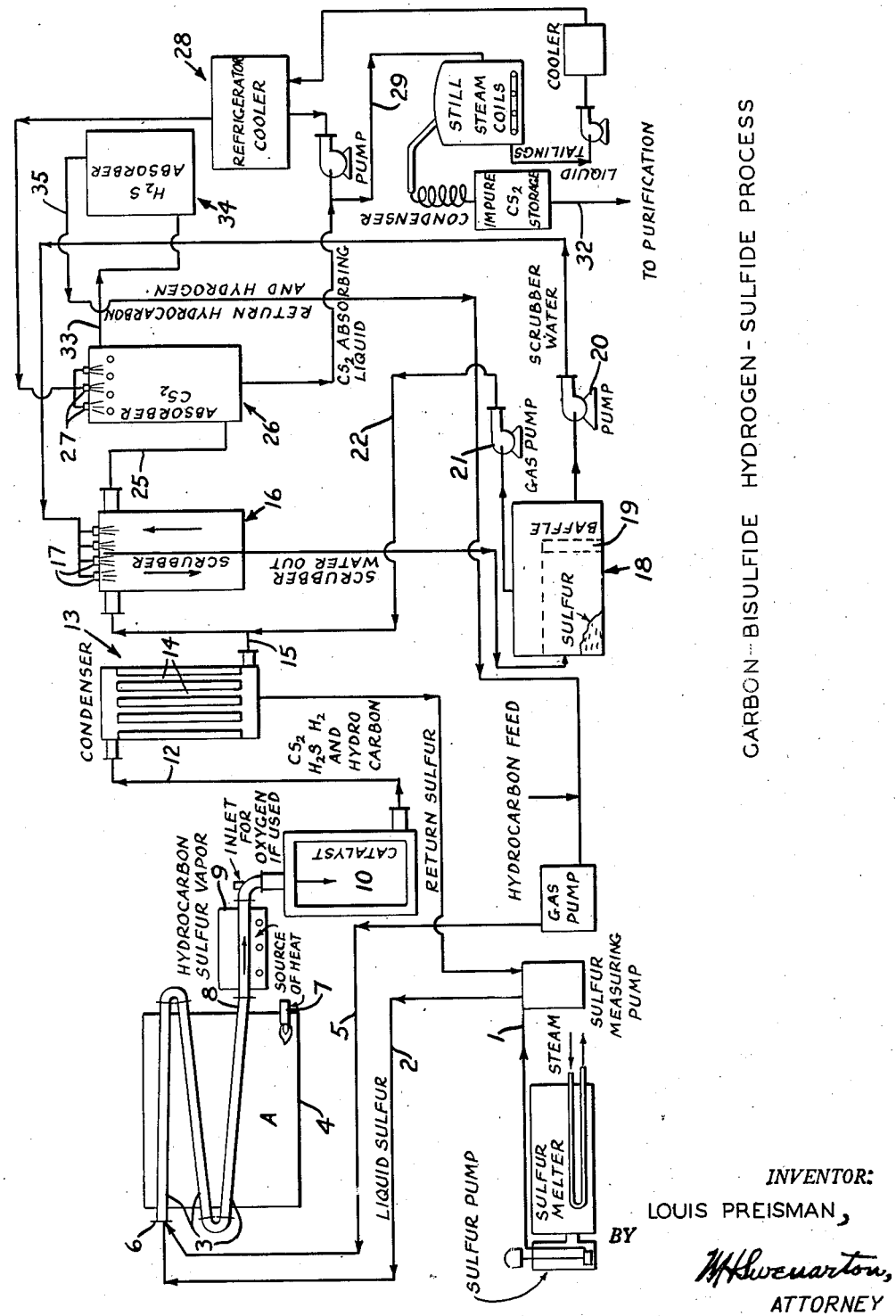
CARBON-BISULFIDE HYDROGEN-SULFIDE PROCESS
INVENTOR:
LOUIS PREISMAN,
BY
*H H Swenarton*,
ATTORNEY Patented June 21, 1949

2,474,067

UNITED STATES PATENT OFFICE 2,474,067

PRODUCTION OF CARBON BISULFIDE AND HYDROGEN SULFIDE

Louis Preisman, Charleston, W. Va., assignor to Barium Reduction Corporation, Charleston, W. Va., a corporation of Delaware Application May 3, 1946, Serial No. 667,004

2 Claims. (Cl. 23—206)

This invention relates to the production of carbon bisulfide and hydrogen sulfide by the interaction of hydrocarbons in a gaseous state with sulfur vapor and has for its particular objects the provision of an expeditious safe and economical method for simultaneously producing such products of a high degree of purity and with an almost theoretrical conversion of the sulfur utilized in such production into said products, viz., a conversion of about 95%.

A further object of the invention resides in the employment of a novel catalyst, namely natural bauxite, which is unusually cheap and yet remarkably efficient for promoting the combination of the reacting components. Other objects of the invention are hereinafter set forth.

Heretofore, as I am well aware, it has been proposed, as set forth in the Patent No. 2,214,859, to produce gaseous hydrogen sulfide by the direct interaction of pre-vaporized sulphur and gaseous hydrogen at atmospheric pressure in the presence of a catalyst which included at least one compound of group consisting of the oxides and sulphides of cobalt, nickel and molybdenum and accordingly I disclaim, as not being within the scope of my invention as embraced within the scope of the appended claims, any such method wherein such special, relatively expensive catalytic material is employed and hydrogen gas as distinguished from hydrocarbons is the gaseous medium employed and also the conditions of operation as required by the disclosure of said patent are maintained. The advantages possessed by my novel method over that disclosed in said patent are fully set forth in the following detailed description of our invention and the drawings forming a part thereof, in which latter is shown a diagrammatic flow sheet of my method as commercially practiced.

In carrying out my invention, either saturated or unsaturated hydrocarbons may be employed to react with the sulfur vapors and such reactions in general are represented by the following equations:

*Saturated gaseous hydrocarbon*

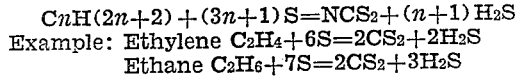

Example: Ethylene $C_2H_4 + 6S = 2CS_2 + 2H_2S$
Ethane $C_2H_6 + 7S = 2CS_2 + 3H_2S$

*Unsaturated hydrocarbons*

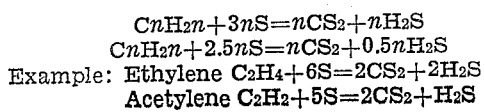

Example: Ethylene $C_2H_4 + 6S = 2CS_2 + 2H_2S$
Acetylene $C_2H_2 + 5S = 2CS_2 + H_2S$ In the accompanying drawings the apparatus which is preferably employed in carrying out the aforesaid method is diagrammatically illustrated.

Referring to the drawings and the method of making carbon bisulfide in the apparatus as illustrated therein, molten sulfur is pumped from the steam-heated sulfur melter by the sulfur pump to the conduit 1 which delivers the same into the sulfur measuring pump that in turn discharges measured slugs of such molten sulfur at predetermined intervals, via the conduit 2, into the intake end of a bank of inclined tubes 3 of slightly oversized vaporizer 4. These tubes are desirably formed of chrome nickel steel or other heat-resisting iron and steel alloy. The gas pump serves to deliver saturated and/or unsaturated hydrocarbons such as aforesaid, preferably natural gas supplied by the hydrocarbon feed to the suction side of the pump, into the supply conduit 5 which discharges into said tubes 3 at a point in close proximity to the discharge end of conduit 2. A closure plate 6, through which the conduits 2 and 5 project serves to seal the inlet end of said bank of tubes against the entrance of extraneous air. The chamber A of the vaporizer is heated preferably by the direct flame of a burner 7.

The hot mixture of sulphur vapors and hydrocarbon gas which is discharged from the vaporizer passes through the conduit 8, via a gas-fired heat exchanger 9, into a fire-brick-lined steel catalyst chamber 10 that is filled with small pieces of the well-known natural ore, bauxite. The latter is extensively mined in North America, South America and elsewhere, but the ore mined in South America has been found to be the most desirable of the available bauxites for use in the conversion of the mixture of sulphur vapors and hydrocarbon gas into carbon bisulfide and hydrogen sulphide, it being possible by this method to obtain approximately a 95% conversion of the sulphur fed into the catalyst chamber into carbon bisulfide and hydrogen sulphide. If the reaction which occurs in the catalyst chamber is endothermic due to the use of large percentages of saturated hydrocarbons, such for example as methane (natural gas), it is necessary to maintain the temperature of the mixture so introduced therein at an optimum temperature by supplying additional heat desirably supplied by a small stream of oxygen from an external source through the inlet fitting 11. If larger percentages of unsaturated hydrocarbons are introduced into the gas stream, it is possible to maintain the optimum temperature in the catalyst chamber with less oxygen than would otherwise be required, since the unsaturated hydrocarbons, such as acetylene for example, react with sulphur exothermically, i. e. with the liberation of heat. The temperature of the reaction at the entrance to the catalyst chamber is desirably maintained above 1000° F., preferably nearly 1500° F., and this can be effectively controlled by varying the flow, to the extent required, of the excess hydrocarbon gas and the amount of the additional heat supplied to the mixture as aforesaid.

The products of the reaction in the catalyst chamber, which comprise principally carbon bisulfide, hydrogen sulfide, small quantities of water vapor, the excess of hydrocarbon gas and about 4% of the unreacted sulphur originally fed into the vaporizer, are conducted through the conduit 12 to a tubular condenser 13, around the tubes 14 of which steam-heated water at a temperature of about 212° F. is being circulated, and therein the free sulphur is condensed out. From the condenser the uncondensed gases with traces of sulphur mist are conducted through a conduit 15 to a scrubber 16 wherein they are freed from the last traces of sulphur mist by water sprays delivered from the nozzles 17. Desirably the scrubber is equipped with baffles, not shown, so that the gases may be sprayed as they pass in a co-flow relation with the water sprays and will then reverse so as to flow counter to the water. The scrubber water passes to a large closed settling tank 18, provided with a baffle 19, wherein the sulfur settles out. The clear water which overflows such baffle is returned by the pump 20 to the spray nozzles 17 re-use therein while the gases which are liberated in such tank are exhausted by the gas pump 21 and returned thereby through the conduit 22 to the gas system. The gases issuing from the scrubber 16 pass through the conduit 25 to a second absorber 26 wherein the same are subjected to sprays of petroleum oil or other low volatile solvent for $CS_2$ issuing from the nozzles 27. Preferably, in order to insure of the maximum solubility of $CS_2$ therein, the solvent employed is refrigerated in the cooler 28 and repeatedly cycled through the absorber, the said cooler and then back to the absorber, while continuously bleeding a small portion thereof through the conduit 29 into the still. The condensed solvent which is recovered by distillation and condensation, is delivered into the impure storage tank from which is is periodically withdrawn through the outlet conduit 32 thereof and purified in the well-known manner. The gases leaving the absorber 26, which comprise unreacted hydrocarbons, water vapor and hydrogen sulfide, are then passed through the outlet conduit 33 to the hydrogen sulfide absorber 34 wherein the $H_2S$ is absorbed in either sodium or potassium hydroxide, in solution, or ammonia or in a solution of a heavy metal salt or hydroxide. If an alkali absorbent is employed, the corresponding bisulfide (sulphhydrate) or sulphide will be obtained. If ammonia is employed, with control of the temperature, ammonium sulfide results whereas in the event of the employment of a heavy metal hydrate or salt, such as zinc, hydroxide, or other salt, for example, the corresponding insoluble sulphide will be produced. The unreacted hydrocarbon gases are returned from the absorber 34 through the outlet conduit 35 to said gas pump for re-use in the system. The supply of hydrocarbon gas is replenished as rapidly as the same is consumed from the hydrocarbon feed and thereby a constant but small excess of hydrocarbon gas is maintained in the system.

The purpose of using oxygen gas and/or unsaturated hydrocarbons is to produce sufficient heat in the catalyst chamber to maintain the temperature of the catalyst at the optimum, viz., above 1000° F., and desirably about 1500° F., since the reaction when employing natural gas or other saturated hydrocarbon is endothermic, or otherwise the temperature would rapidly fall until finally the reaction would entirely cease. Desirably the said heat exchanger 9 is utilized as the same helps to maintain the optimum temperature aforesaid in the catalyst chamber and thereby minimizes the amount of unsaturated hydrocarbon or oxygen otherwise required for that purpose.

The heat necessary to maintain the cooling water circulating in the condenser 13 at a boiling temperature is supplied by heat interchange with the gases being cooled, such water being supplied to the condenser in sufficient quantity to replenish that which is evaporated therein. The introduction of a stream of hydrocarbon gas over the boiling sulphur in the vaporizer 4, tends to reduce the boiling point of the sulphur or, conversely to increase the rate of vaporization thereof. Furthermore, the provision of a vaporizer which is slightly over capacity insures that each slug of sulphur delivered thereto will be completely volatilized.

Among the principal features and advantages of my improved method of producing carbon bisulfide and hydrogen sulfide are:

(1) The simultaneous production of hydrogen sulfide and carbon bisulfide by reacting sulphur vapor with hydrocarbon gases in a catalyst chamber containing a catalyst comprising crushed natural bauxite, at temperatures in excess of 1,000° F.

(2) Supplying sufficient heat to maintain the reaction in the catalyst by the use of external heating means.

(3) The use of unsaturated hydrocarbons, in part or total, to produce additional heat of reaction.

(4) The introduction of oxygen gas into the gas stream, whereby the oxidation of hydrocarbon gases to form water produced the necessary heat units.

(5) The pumping of measured amounts of liquid sulphur into an externally heated tubular vaporizer, slightly over capacity, so that each complete periodic slug of sulphur pumped into the vaporizer is completely volatilized.

(6) The promotion of the boiling or vaporizing of sulphur by introducing a stream of hydrocarbon gas over the boiling sulphur and in that way reduce the boiling point or conversely increase the rate of evaporization.

(7) The increasing of the rate of reaction between the hydrocarbon and the sulphur gases by utilizing the excess of hydrocarbons which exist after absorption of the products of reaction (hydrogen sulfide and carbon bisulfide) as a result of the return of the same to the front end of the process for re-use.

(8) The stripping of the carbon bisulfide gas in an absorbing tower by the use of cold petroleum oils or other organic liquids in which carbon bisulfide is soluble.

(9) An almost theoretical conversion, some 95%, of the sulphur fed in is obtained by this process.

(10) The condensing of the small amount of unreacted sulphur (5%) in an all-steel vertical tube cooler, cooled by boiling water, and removal of the last traces of sulphur mixed in the gas by introducing the same in a water-supplied scrubbing tower.

While bauxite ore is preferred as the catalyst material in my improved method wherein unsaturated hydrocarbons are used or, in lieu thereof, oxygen to produce an endothermic reaction and thereby maintain an optimum temperature in the catalyst chamber, other catalysts such as activated carbon, alumina gel or alumina gel coated with metallic sulfides or like catalysts may be successfully employed notwithstanding the fact that none of such other catalysts produce as high yields of carbon bisulfide and hydrogen sulfide as does bauxite ore and in general are much more expensive.

The applicant, together with Charles F. Hobson as co-inventor, filed application Ser. 639,081 the 4th of January 1946 entitled Method of making hydrogen sulphide.

Various modifications of the method above described may be made without departing from the spirit of the invention as embraced within the scope of the appended claims.

Having thus described my invention, what I claim is:

1. The method of making carbon bisulfide and hydrogen sulfide, which comprises intermittently introducing at predetermined intervals into a vaporizing chamber metered amounts of sulphur in the form of individual slugs of molten sulphur of a predetermined size, admitting thereto a hydrocarbon gas in an amount substantially in excess of the molecular equivalent of the sulphur in order to accelerate the volatilization of the sulphur slugs while simultaneously maintaining the temperature in said chamber above the boiling point of sulphur, then conducting the mixture of sulphur vapors and hydrocarbon gas through a heated catalyst capable of promoting reaction between the sulphur and the hydrocarbon gas while heating such catalyst to a temperature favorable to the formation of carbon bisulfide and hydrogen sulfide and then separately recovering the two latter products.

2. In the method of making carbon bisulfide, the steps which comprise intermittently introducing into a vaporizing chamber at predetermined intervals metered amounts of molten sulphur in the form of individual slugs of a predetermined size, while maintaining the temperature in said chamber above the boiling point of the sulphur, and admixing a stream of a hydrocarbon gas, in an amount in excess of the molecular equivalent of the sulphur, with the latter and then subjecting the resultant mixture to the action of a catalyst capable of promoting reaction between sulphur and the hydrocarbon gas, while maintaining the temperature within the catalyst above 1,000° F., by supplying to the same sufficient unsaturated hydrocarbons to render the reaction therein exothermic.

LOUIS PREISMAN.

REFERENCES CITED

The following references are of record in the file of this patent:

UNITED STATES PATENTS

| Number | Name | Date |
| --- | --- | --- |
| 1,476,645 | Robinson | Dec. 4, 1923 |
| 1,613,632 | Wilkinson | Jan. 11, 1927 |
| 2,187,393 | Simo | Jan. 16, 1940 |
| 2,214,859 | Mande et al. | Sept. 17, 1940 |
| 2,330,934 | Thacker | Oct. 5, 1943 |
| 2,369,377 | Thacker | Feb. 13, 1945 |